United States Patent
Watanabe et al.

(10) Patent No.: US 7,684,102 B2
(45) Date of Patent: Mar. 23, 2010

(54) OSCILLATOR DEVICE AND IMAGE FORMING APPARATUS USING THE SAME

(75) Inventors: Shinichiro Watanabe, Yamato (JP); Yasuhiro Shimada, Sagamihara (JP); Yasushi Mizoguchi, Okazaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 11/971,079

(22) Filed: Jan. 8, 2008

(65) Prior Publication Data
US 2008/0180771 A1    Jul. 31, 2008

(30) Foreign Application Priority Data
Jan. 10, 2007   (JP) ............... 2007-001885

(51) Int. Cl.
*G02B 26/08* (2006.01)
(52) U.S. Cl. .................................. 359/224.1
(58) Field of Classification Search ............. 359/199.1, 359/199.3, 212.1, 213.1, 214.1, 223.1–226.1
See application file for complete search history.

(56) References Cited

U.S. PATENT DOCUMENTS

| | | | | |
|---|---|---|---|---|
| 5,969,465 A | * | 10/1999 | Neukermans et al. | ....... 310/333 |
| 6,108,118 A | | 8/2000 | Minamoto | ........... 359/224 |
| 2004/0105139 A1 | * | 6/2004 | Hirose et al. | ........... 359/226 |

FOREIGN PATENT DOCUMENTS

| JP | 11-305162 A | 11/1999 |
|---|---|---|
| JP | 2000-081589 A | 3/2000 |

* cited by examiner

*Primary Examiner*—Euncha P Cherry
(74) *Attorney, Agent, or Firm*—Fitzpatrick, Cella, Harper & Scinto

(57) ABSTRACT

An oscillator device includes a supporting base plate, a supporting member, a movable plate supported by the supporting member for oscillating motion relative to the supporting base plate, a first functional device having a first function, a second functional device having a second function, a first wiring connected to the first functional device and formed on a first surface of the supporting member, and a second wiring connected to the second functional device and formed on a second surface of the supporting member different from the first surface thereof where the first wiring is formed, such that the width of the wirings on the supporting member can be made wide.

12 Claims, 7 Drawing Sheets

OSCILLATOR DEVICE AND IMAGE FORMING APPARATUS USING THE SAME

FIELD OF THE INVENTION AND RELATED ART

This invention relates to an oscillator device having a movable element resiliently supported by a supporting member for oscillating motion. In another aspect, the invention concerns an optical deflector using such oscillator device and an image forming apparatus using such optical deflector.

Optical deflectors are used in image forming apparatuses such as copying machines, laser beam printers, optical instruments such as a bar code reader, and visual display devices in which an image is projected by laser beam scanning.

With regard to optical deflectors which are arranged to mechanically perform optical scanning, generally, polygon mirrors having a rotary polygonal mirror or galvanometer mirrors having an oscillation type reflection mirror are known. Particularly, in the galvanometer mirror type optical deflectors, resonance type optical deflectors using a silicon substrate have been developed based on micromechanics techniques. Since resonance type optical deflectors have an advantage of small size, light weight and low cost, visual display units using such optical deflector have been proposed. Furthermore, as a resonance type optical deflector, a gimbals type optical deflector so configured that light is two-dimensionally scanningly deflected by a single optical deflector has been proposed.

On the other hand, an optical deflector so configured that the deflection angle of a movable plate is detected, has been proposed (see Japanese Laid-Open Patent Application No. 11-305162).

FIG. 9 shows a structural example of this. In the structure shown in FIG. 9, when a power source (not shown) is connected to between two pads 107 formed at two positions on the left-hand side supporting base plate 101 as viewed in the drawing, an electric current flows into an electric coil 105 formed on a movable plate 102 through electric wirings 106 provided on a torsion spring 104. Here, an external magnetic field based on a permanent magnet, not shown in the drawing, acts on those portions of the electric coil 105 which extend along two sides, of the four sides of the movable plate 102, where the torsion spring 104 is not formed. As a result, a Lorentz's force which acts between the external magnetic field and the electric current of the electric coil 105 produces a driving force by which the movable plate 102 is oscillated.

On the other hand, a change in the electrical resistance of a piezoresistive element 108 which results from a strain caused in the torsion spring 104 in response to the oscillation of the movable plate 102 is detected by pads 107 which are formed at four places on the right-hand side supporting base plate 101 as viewed in the drawing, through the electric wirings 106. Based on this, the deflection angle can be detected in this optical deflector.

If a movable plate of an optical deflector having such structure as described above is supported by a single torsion spring, the electric wirings for an electric coil and a piezoresistive element for the angle detection as well as electric wirings for the piezoresistive element have to be provided on the same surface of the torsion spring. Furthermore, if any functional device such as a sensor for detecting a physical quantity should be added to the optical deflector of the above-described structure, electric wirings extending along the torsion spring have to be added.

However, in optical deflectors having such structure as described above, the electric wirings are all provided only on the same surface of the torsion spring. Therefore, practically it is very difficult to add further electric wirings. Furthermore, since in optical deflectors of the structure described above the electric wirings are provided only on the same surface, if the width of the torsion spring should be made smaller, the thickness (width) of the electric wirings must be taken into account.

Although all the wirings could be disposed on the same surface if the width of the individual wirings is made thinner, in such case it would result in a larger electric resistance of the electric wirings and causes larger power consumption. On the other hand, it may be possible alternative that the electric wirings for the electric coil, the piezoresistive element and electric wirings therefor are provided in multiple layers on the same surface of the torsion spring, while using insulating layers. In this case, the electric wirings can be made thick and the electric resistance thereof can be made small. However, making multiple-layer wirings needs additional production processes. Particularly, if the movable plate is oscillated by dissonance, making the torsion spring width smaller is a good measure for realizing low power-consumption drive since it lowers the spring constant. In this respect, the above-described inconveniences should desirably be removed.

SUMMARY OF THE INVENTION

The present invention in one aspect thereof provides an oscillator device, comprising: a supporting base plate; a supporting member; a movable plate supported by said supporting member for oscillating motion relative to said supporting base plate; a first functional device having a first function; a second functional device having a second function; a first wiring connected to said first functional device and formed on a first surface of said supporting member; and a second wiring connected to said second functional device and formed on a second surface of said supporting member different from said first surface thereof where said first wiring is formed.

The present invention in another aspect thereof provides an oscillator device, comprising: a movable plate; a first supporting member; a gimbals configured to support, with said first supporting member, said movable plate for oscillating motion about a first oscillation axis; a second supporting member; a supporting base plate configured to support, with said second supporting member, said gimbals for oscillating motion about a second oscillation axis; a first functional device having a first function; a second functional device having a second function; a first wiring connected to said first functional device and formed on a first surface of at least one of said first supporting member and said second supporting member; and a second wiring connected to said second functional device and formed on a second surface of said at least one supporting member different from said first surface thereof where said first wiring is formed.

In this specification, the words "electric wiring connected to a functional device" refer to an electric wiring itself if the functional device and the electric wiring therefor are clearly distinguished as in the case of a displacement angle sensor or a coil and a wiring therefor; whereas if a portion of the electric wiring functions as the functional device as in the case of a heater wire, the words refer to a wiring which itself is the functional device.

The present invention in a further aspect thereof provides an oscillator chip, comprising: an oscillator device as recited above; wherein said oscillator device is connected to a supporting base plate having an electrode pad, through a spacer, and wherein said electrode pad is electrically connected, through said spacer, to an electrode pad of said oscillator device.

The present invention in a yet further aspect thereof provides an optical deflector, comprising: an oscillator device or an oscillator chip as recited above; and an optical reflection surface provided on said movable plate.

The present invention in a still further aspect thereof provides an image forming apparatus, comprising: a light source; an imaging optical system; an optical deflector as recited above; and a surface to be irradiated with light; wherein said optical deflector is configured to deflect light from said light source so that at least a portion of the light is incident on the surface to be irradiated.

In summary, the present invention in one aspect thereof provides a solution for the difficulties of mounting electric wirings for different functional devices on the same surface of a supporting member, when the width of the supporting member such as a beam-shaped torsion spring which should resiliently support a movable plate for oscillating motion has to be made very narrow or when the movable plate has to be supported by a single supporting member.

Namely, in accordance with an aspect of the present invention, electric wirings for different functional devices are provided on different surfaces of the supporting member, in other words, at relatively spaced-apart points on the supporting member. As a result, at least the individual electric wirings can made wider and, thus, the electrical resistance of the electric wirings can be made small. Furthermore, the width of the supporting member can be made smaller.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1A:
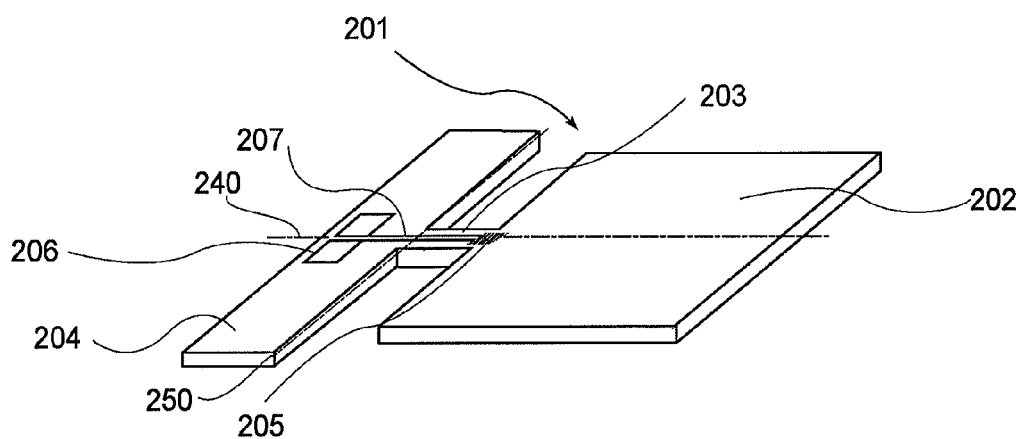
FIG. 1A and FIG. 1B are perspective views showing an oscillator device according to a first embodiment of the present invention.

First of all, embodied forms of oscillator devices according to the present invention will be explained below.

A first embodied form of the present invention may comprise a movable plate of planar shape, a supporting member such as a torsion beam or a curved beam for resiliently supporting the movable plate for oscillating motion relative to a supporting base plate, a first functional device providing a first function and a second functional device for providing a second function. Here, although the functional devices may be disposed at any positions, electric wirings to be connected to the first functional device should be formed on at least a first surface of the supporting member, while electric wirings to be connected to the second functional device should be formed on a second surface of the supporting member, different from the first surface where at least the electric wirings connected to the first functional device are formed.

The functional device may be a sensor such as, for example, a physical quantity measuring sensor for detecting a certain physical quantity to be detected and outputting the same as an electrical signal; an actuator for producing oscillation of the movable plate relative to the supporting base plate through the supporting member; or a heater for regulating the temperature of the beam-shaped supporting member. The physical quantity to be detected may be, for example, a displacement angle of the oscillating movable plate; an acceleration to be applied to the movable plate from the outside; or an electric potential of the measuring object.

In the case of a displacement angle sensor, as an example the actuator for oscillating the movable plate may be feedback controlled based on a signal from this sensor so that the movable plate can be oscillated in a predetermined form. Alternatively, a heater which is provided separately may be controlled based on it. Examples of such displacement angle sensor are a piezoresistive element to be described below and a coil.

In the case of an acceleration sensor, the acceleration to be applied to the movable plate when the same is held stationary may be detected based on a signal from this sensor.

In the case of an electric potential sensor, the electric potential of the subject may be measured based on a signal from a sensor including a detection electrode on the movable plate, being disposed opposed to the measuring object. In this case, during the potential measurement, generally the movable plate is oscillated by the actuator in a predetermined form. Therefore, a displacement angle sensor may be added so as to maintain the predetermined oscillation form.

The supporting member may extend between the supporting base plate and the movable plate, and it may have a polygonal shape or a shape like a polygon in its section perpendicular to the direction of elongation, the shape being defined by a plurality of straight or curved lines.

The first surface mentioned above may be a surface related to one of these lines, and the second surface may be a surface concerning another line. The electric wirings of different functional devices are formed on these separate surfaces, respectively, and therefore the width of the electric wirings can be made wide, with a comparatively larger margin.

Typically, the supporting member may have a beam-like shape being elongated as compared with the size in its section. The supporting member may have any cross-sectional shape and, typically, it may have a polygonal shape such as quadrangle shape. However, it may be an X, H or V-shape. When the cross-sectional shape of the supporting member is defined by a single curve like a circle or an oval, the electric wirings for respective functional devices may be formed at positions which are angularly and comparatively largely spaced from each other around the center of the section.

With regard to the disposition of the movable plate, supporting member and supporting base plate, typically the movable plate may be movably supported by the supporting base plate through a single supporting member, as will be described with reference to a first embodiment below. However, the following disposition may be taken.

For example, the movable plate may be movably supported by the supporting base plate through a pair of supporting members. As a further alternative, a plurality of supporting members and a plurality of movable plates may be alternately connected in series, such that each movable plate is movably supported by the supporting base plate. Furthermore, with regard to the form of oscillation of the movable plate, if the supporting member comprises a beam-shaped torsion beam, the movable plate will produce torsional oscillation about the torsion axis (an axis like a torsion axis 240 in the structure of FIG. 1A to be described below) extending in the direction of elongation of the torsion beam. On the other hand, if the supporting member comprises a curved beam, the movable plate will produce flexure oscillation about an axis extending approximately perpendicularly to the direction of elongation of the curved beam (i.e., an axis like axis 250 in the structure of FIG. 1A to be described below).

A second embodied form of the present invention may comprise a movable plate, a first supporting member for resiliently supporting the movable plate relative to a gimbals, a second supporting member for resiliently supporting the gimbals relative to a supporting base plate, a first functional device providing a first function and a second functional device for providing a second function. The movable plate may have a planar shape, and the gimbals may have a frame-like shape. The supporting member may be a beam-shaped torsion beam or a curved beam.

In the second embodied form as well, although the functional devices may be disposed at any positions, the electric wirings to be connected to the first functional device should be formed on a first surface of at least one of the first supporting member and the second supporting member, while the electric wirings to be connected to the second functional device should be formed on a second surface different from the at least one first surface.

In the second embodied form as well, with regard to the disposition of the movable plate, gimbals, supporting member and supporting base plate, as will be described with reference to a second embodiment described below, typically the movable plate may be supported by the gimbals through a pair of supporting members, while the gimbals may be supported by the supporting base plate through another pair of supporting members. However, the following disposition may be taken.

For example, a plurality of gimbals may be disposed telescopically around a movable plate. An example structure is that: the movable plate may be movably supported by a first gimbals through a pair of supporting members, and the first gimbals may be movably supported by a second gimbals through another pair of supporting members, while the second gimbals is movably supported by a third gimbals or a supporting base plate through a further pair of supporting members.

In summary, the present invention is effectively applicable to any oscillator device having a plurality of functional devices, provided that electric wirings to these functional devices have to be formed on any one but the same supporting member.

In the structure described above, the actuator may comprise a magnetic coil and a permanent magnet, for example, and the electric coil may be disposed on either the gimbals or the movable plate. The actuator may be based on an electrostatic method using a pair of electrodes one of which is formed on the movable plate while the other is formed at the stationary side opposed to the movable plate. Alternatively, a piezoelectric actuator using a piezoelectric element of an oscillation source provided on the movable plate, supporting member or supporting base plate, may be used.

In any of these methods, the functional device such as actuator may be disposed on at least one of the movable plate and the supporting member, or it may be disposed on at least one of the movable plate, gimbals and first and second supporting members.

In accordance with the embodied forms of the present invention described above, the electric wirings for different functional devices may be provided on different surfaces of the supporting member, namely, at positions on the supporting member which are comparatively spaced apart from each other. Therefore, individual electric wirings can be made comparatively wide, and the electrical resistance of them can be lowered. Furthermore, the width of the supporting member can be made comparatively narrow.

Hence, in an oscillator device in which, a sensor for detecting a desired physical quantity and an actuator for driving a movable plate should be provided on the same base plate, the inconveniences concerning the placement of the wirings on the beam-shaped supporting member as described hereinbefore can be removed. In addition to this, there are further advantageous results obtainable such as prevention of crosstalk between electric wirings, prevention of breaking of the electric wirings, and easiness of electric wiring production, and so on.

Now, preferred embodiments of the present invention will be described with reference to the attached drawings.

First Embodiment

A first embodiment of the present invention concerns an oscillator device 201 in which electric wirings for a sensor (first functional device) for detecting a desired physical quantity and electric wirings for a movable-plate driving actuator (second functional device) are formed on different surfaces of a beam 203 of a supporting member, respectively.

Figure 1B:
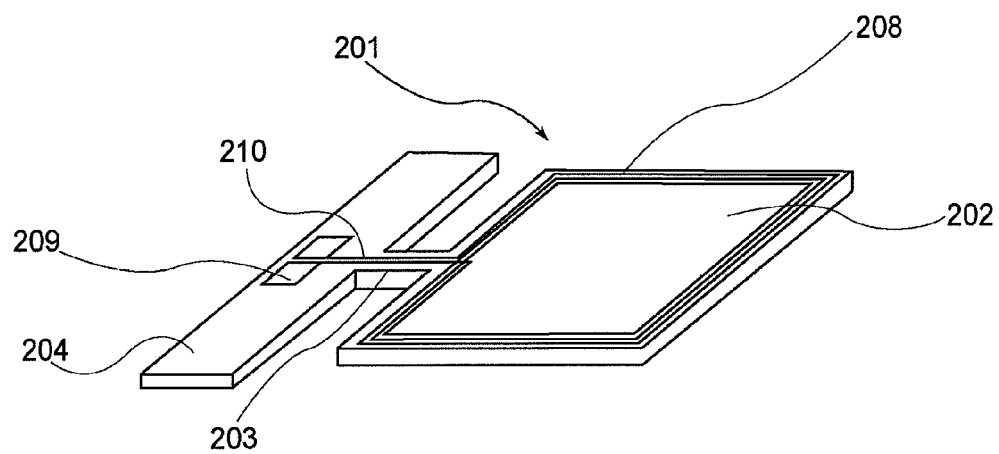

FIG. 1A and FIG. 1B are structural views for explaining the oscillator device 201 according to the present embodiment.

Specifically, FIG. 1A is a perspective view illustrating a first surface of the movable plate 201 and so on of the present embodiment. With regard to the movable plate 201, the supporting base plate 204 resiliently supports the movable plate 202 for oscillation motion, through a beam 203. Here, the movable plate 202, beam 203 and supporting base plate 204 are formed integrally by processing a single monocrystal silicon substrate based on semiconductor processes.

Mounted in a portion of the first surface of the movable plate 202 and the beam 203 is a sensor 205 which measures a desired detection physical quantity. The desired physical quantity detected by the sensor 205 is converted into an electrical signal, and the signal is detectable at detecting electrode pads 206 through electric wirings 207. The sensor 205 may comprise an angle sensor for detecting the torsion angle of the beam 203, for example. In that occasion, a piezoresistive element can be used.

FIG. 1B is a perspective view of a second surface of the movable plate 201 and so on, which surface is at the back of the first surface. The supporting base plate 204 resiliently supports the movable plate 202 for oscillation motion, through a beam 203, this being the same as described above. There is an electric coil 208 of the actuator, mounted on the second surface of the movable plate 202. Here, the actuator comprises the electric coil 208 and a permanent magnet (not shown). There are electric wirings 210 of the electric coil 208, which are formed on the second surface of the beam 203. A driving current signal is inputted to the coil from driving electrode pads 209.

A magnetic field is produced in response to application of a driving current signal to the electric coil 208 from the driving electrode pads 209, and this magnetic field interacts with the magnetic field of the permanent magnet. As a result of this, the movable plate 202 is oscillated by an electromagnetic force. If the beam 203 comprises a beam-shaped torsion beam, the movable plate 201 produces torsional oscillation about an axis 240 extending in the direction of elongation of the beam 203. If the beam 203 comprises a curved beam, the movable plate produces oscillation about an axis 250 which extends approximately perpendicularly to the direction of elongation of the beam 203, at an end portion close to the junction with the supporting base plate 204.

There is an intermediate insulating layer (not shown) which is formed below the lead wire portion from the innermost winding of the electric coil, to avoid electric connection with the outer windings of the electric coil. Such intermediate insulator layer may be made of polyimide, for example.

In accordance with the present embodiment, the electric wirings 207 on the first surface of the beam 203 and the electric wirings 210 on the second surface thereof are provided on different surfaces. Therefore, individual electric wirings can be made wide, and the electrical resistance of them can be made small.

Figure 2A:
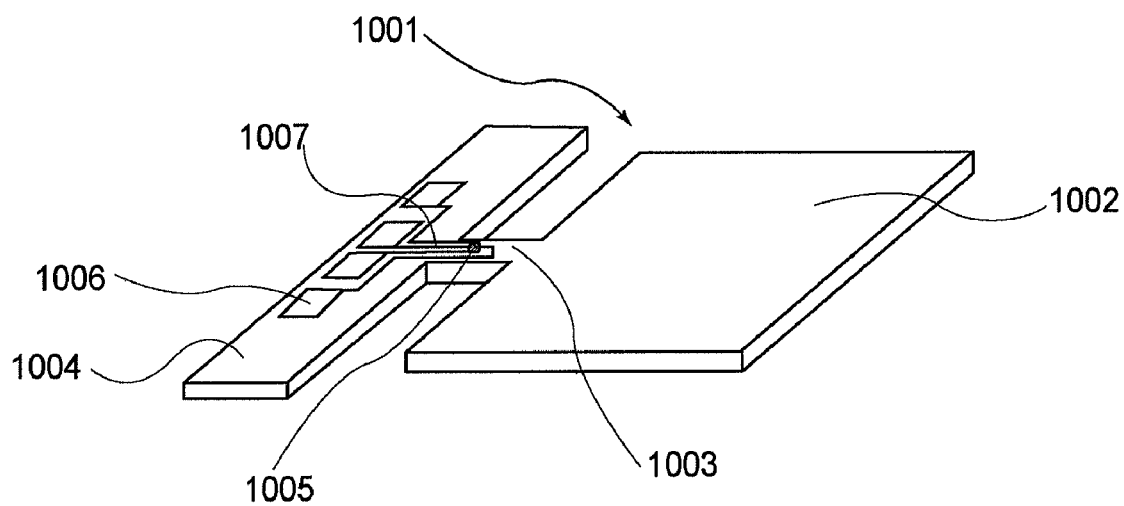
FIG. 2A and FIG. 2B are perspective views showing an oscillator device according to a second embodiment of the present invention.
Figure 2B:
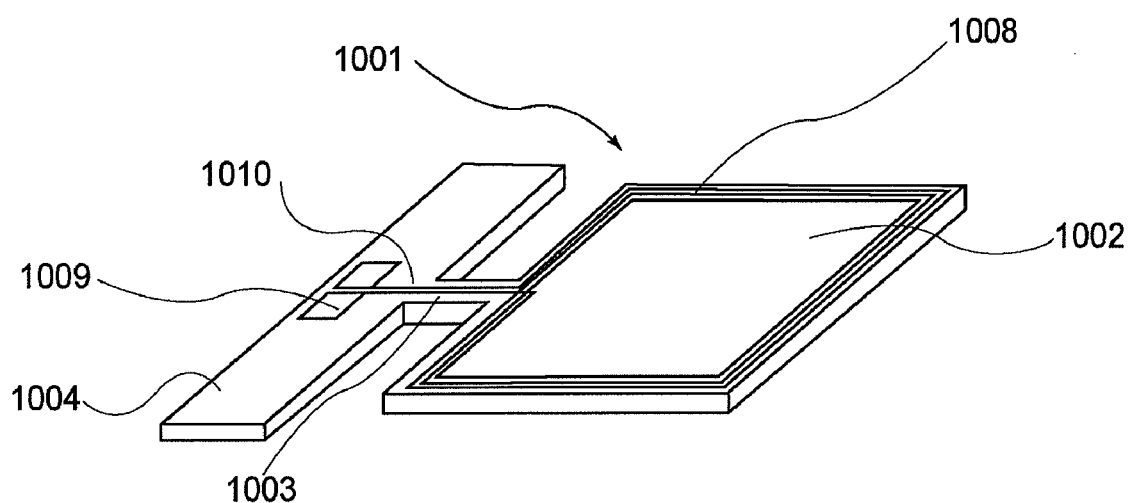

FIG. 2A and FIG. 2B are structural views for explaining a movable plate and so on in a modified example of the first embodiment.

FIG. 2A is a perspective view showing a first surface of a movable plate 1002 and so on. In this modified example, the supporting base plate 1004 resiliently supports the movable plate 1002 for torsional oscillation, through a torsion spring (supporting member) 1003. Here, a piezoresistive element 1005 is provided only on the first surface of the torsion spring 1003, as an angle sensor for detecting the displacement angle of the movable plate 1002. With this arrangement, a change in the electrical resistance of the piezoresistive element 1005 due to a strain which occurs in the torsion spring 1003, can be detected at detecting electrode pads 1006 through electric wirings 1007. Here, four electric wirings 1007 extend from the piezoresistive element 1005. The first surface of the movable plate 1002 is provided with an optical reflection surface for reflecting light. Thus, the oscillator device 1001 of the present embodiment can be used as an optical deflector.

FIG. 2B is a perspective view, showing the second surface of the movable plate 1002 and so on, which surface is at the back of the first surface. There is an electric coil 1008 of the actuator for driving the movable plate 1002, which coil is mounted on the second surface of the movable plate 202. The electric wirings 1010 for the electric coil 1008 are formed on the second surface of the torsion spring 1003, and a driving signal is input from the driving electrode pads 1009. A magnetic field is produced in response to application of a driving current signal to the electric coil 1008 from the driving electrode pads 1009, and this magnetic field interacts with the magnetic field of the permanent magnet. As a result of this, the movable plate 1002 is torsionally oscillated by an electromagnetic force.

In this modified example as well, the electric wirings 1007 on the first surface of the torsion spring 1003 and the electric wirings 1010 on the second surface thereof are provided on different surfaces, respectively. Thus, individual electric wirings can be made wide, and the electrical resistance of them can be made small.

Although in this modified example the piezoresistive element 1005 which is an angle sensor is mounted only on the torsion spring 1003, the angle sensor may be provided only on the first surface of the movable plate 1002. In that occasion, the displacement angle (deflection angle) can be detected from kinetic flexure of the movable plate 1002 being oscillated. The remaining features are similar to those of the first embodiment.

Second Embodiment

Figure 3A:
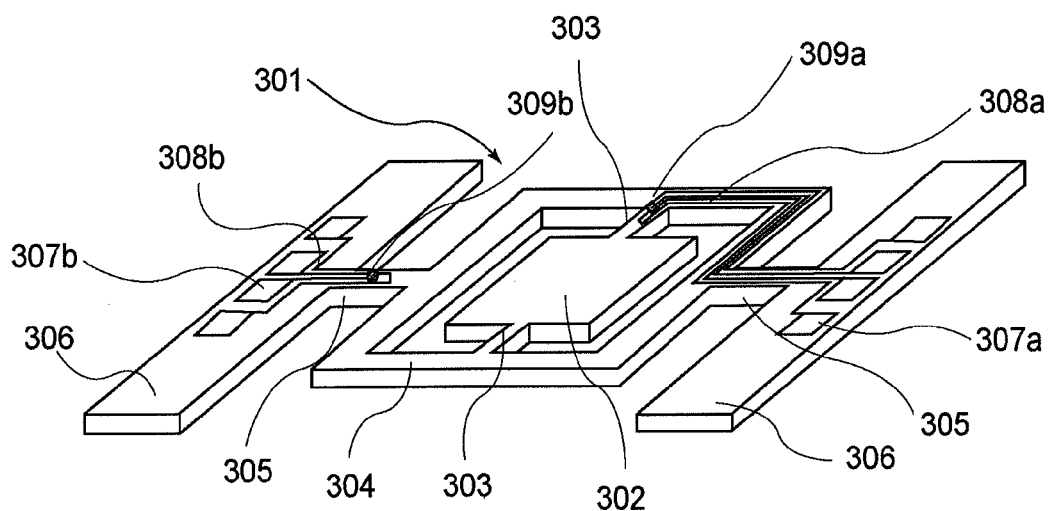
FIG. 3A and FIG. 3B are perspective views showing an oscillator device according to a third embodiment of the present invention.
Figure 3B:
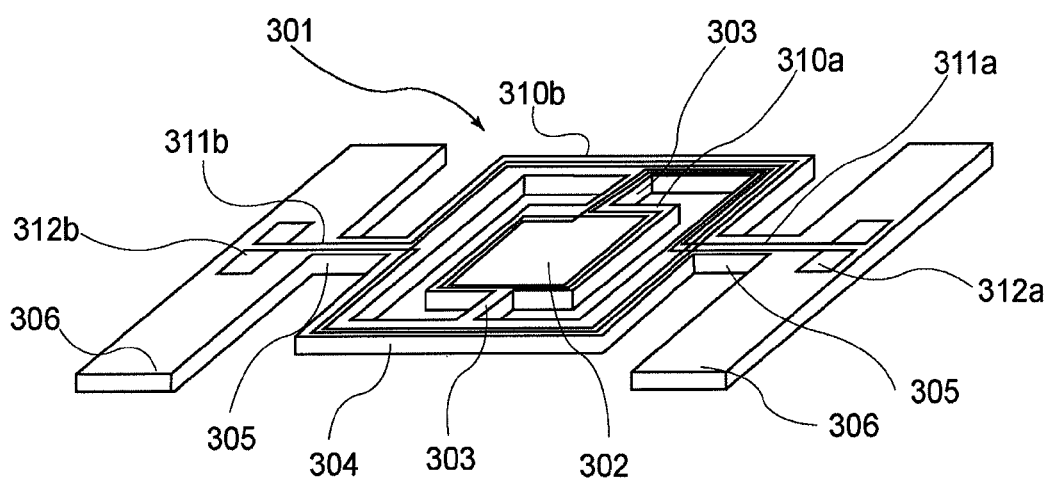

FIG. 3A and FIG. 3B are structural views for explaining a movable plate and so on according to a second embodiment of the present invention.

FIG. 3A is a perspective view of the first surface of the movable plate 301 of an oscillator device 301 according to the present embodiment.

In this embodiment, gimbals 304 functions to resiliently support the movable plate 302 for torsional oscillation, through first torsion springs 303. In this example, resonance drive based on a sine wave is produced here. Supporting base plates 306 function to resiliently support the gimbals 304 for torsional oscillation, through second torsion springs 305, and dissonance drive is produced here.

The oscillation axes of the movable plate 302 and the gimbals 304, which are axes each being defined by connecting a pair of torsion springs 303 or 304, are orthogonal to each other. With this arrangement, desired two-dimensional oscillation of the movable plate 302 is accomplished.

In the present embodiment, for low power-consumption dissonance oscillation of the gimbals 304, the width of second torsion springs 305 should be made narrow, and this is accomplished by the disposition of electric wirings 308a and 308b and electric wirings 311a and 311b to be described below. The first surface of the movable plate 302 is provided with an optical reflection surface for reflecting light. Thus, the oscillator device 301 can be used as an optical deflector.

A piezoresistive element 309b for detecting the torsion angle of the gimbals 304 is disposed on the first surface of the left-hand side second torsion spring 305 as viewed in FIG. 3A. Signals of the piezoresistive element can be detected at detecting electrode pads 307b provided on the left-hand side supporting base plate 306, through the electric wirings 308b.

On the other hand, a piezoresistive element 309a for detecting the torsion angle of the oscillating movable plate 302 is disposed on the first surface of the upper-side first torsion spring 303 as viewed in FIG. 3A. Signals from this piezoresistive element can be detected at the detecting electrode pads 307a provided on the right-hand side supporting base plate 306 in FIG. 3A, through the electric wirings 308 formed on the first torsion spring 303, gimbals 304 and second torsion spring 305.

FIG. 3B is a perspective view of the second surface of the movable plate 302 and so on of the present embodiment. An electric coil 310b of the actuator for driving the gimbals 304 is disposed on the second surface of the gimbals 304. Through electric wirings 311b, a driving current signal is inputted thereto from the driving electrode pads 312b on the left-hand side supporting base plate 306 as viewed in FIG. 3B. An electric coil 310a of the actuator for driving the movable plate 302 is disposed on the second surface of the movable plate 302. Through electric wirings 311a, a driving current signal is inputted thereto from the driving electrode pads 312a on the second surface of the right-hand side supporting base plate 306 as viewed in FIG. 3B.

A dual-axis drive optical deflector needs more wirings as compared with a single-axis drive deflector. Hence, it is practically difficult to provide the electric wirings for an angle detecting sensor and the electric wirings for an electric coil of the driving actuator, on the same surface of the torsion spring. In accordance with the present embodiment, in the oscillator device 301 the electric wirings 308a and 308b for the piezoresistive elements 309a and 309b and the electric wirings 311a and 311b for the electric coils 310a and 310b are provided on different surfaces of the torsion springs 303 and 305, respectively. With this arrangement, the width of these electric wirings can be made wide in this embodiment as well and, thus, the electrical resistance of the electric wirings can be made small.

Third Embodiment

Figure 4:
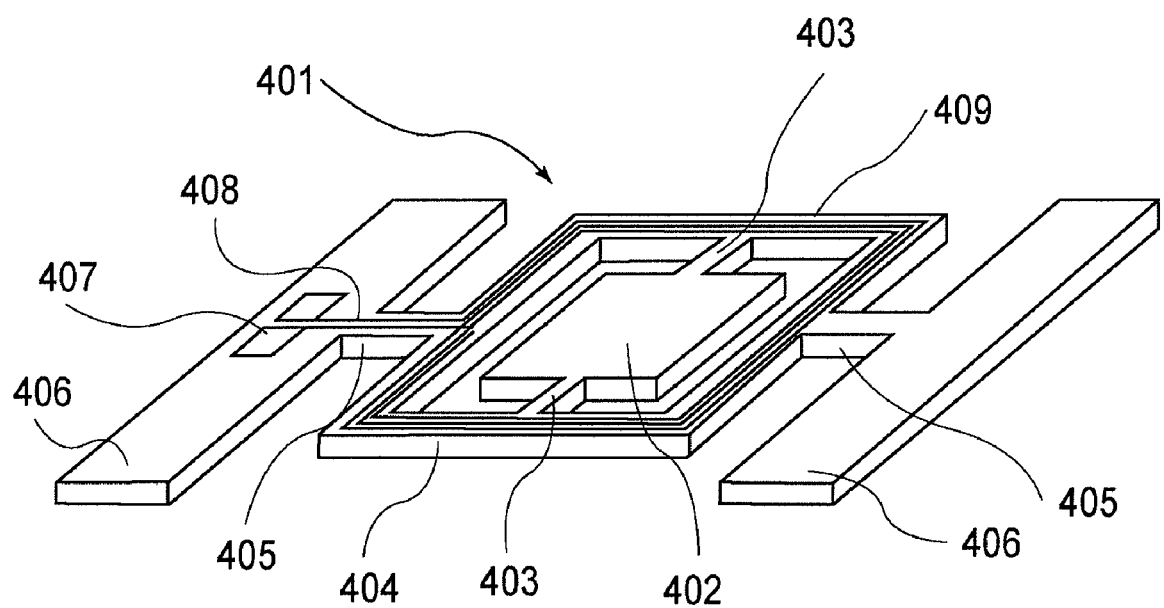
FIG. 4 is a perspective view showing an oscillator device according to a fourth embodiment of the present invention.

FIG. 4 is a structural view for explaining a movable plate and so on according to a third embodiment of the present invention.

The first surface of an oscillator device 401 according to the third embodiment is similar to the first surface of the second embodiment shown in FIG. 3A.

In this embodiment, a gimbals 404 resiliently supports the movable plate 402 for torsional oscillation, through first torsion springs 403. Supporting base plates 406 resiliently support the gimbals 404 for torsional oscillation, through second torsion springs 405. With regard to the second surface of the oscillator device 401 of the third embodiment, as shown in FIG. 4, only the second surface of the gimbals 404 is provided with an electric coil 409 of the driving actuator.

For two-dimensional scan of the oscillator device 401 in a desired form, a sinusoidal wave for oscillating the movable plate 402 relative to the gimbals 404, for example, is applied to the electric coil 409. In addition to this, a sawtooth wave for oscillating the gimbals 404 relative to the supporting base plate 406 is applied. By superposedly applying these two driving current signals from the driving electrode pads 407, the movable plate 402 can be oscillated two-dimensionally.

In the oscillator device 401 of the present embodiment as well, the electric wirings of the piezoresistive element for angle detection and the electric wirings 408 of the electric coil 409 are formed on separate surfaces of the torsion spring 405, respectively. With this arrangement, individual electric wirings can be made wide, and the electrical resistance of them can be made small.

Fourth Embodiment

Figure 5:
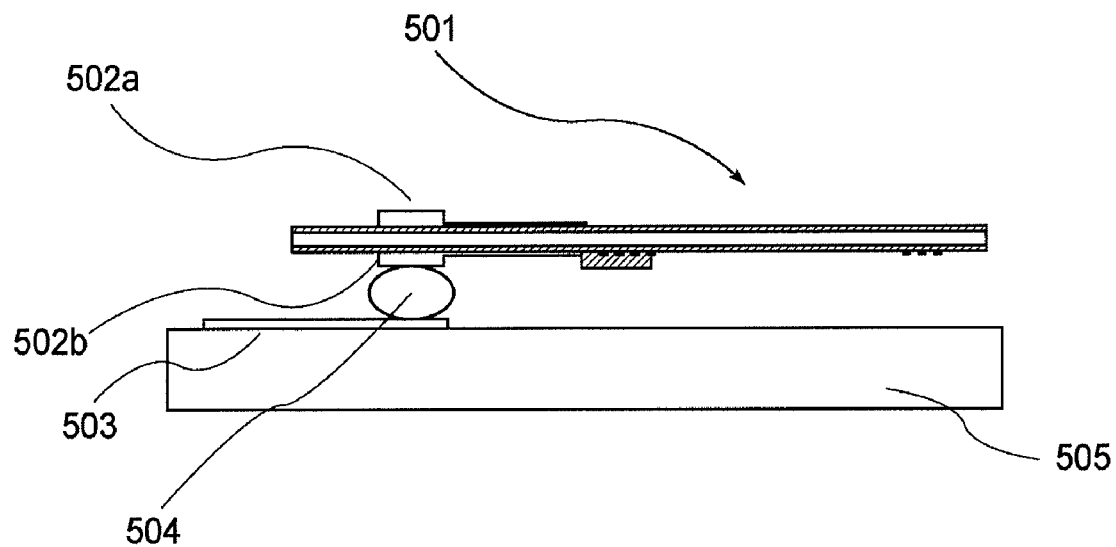
FIG. 5 is a sectional view showing an oscillator device according to a fifth embodiment of the present invention.

FIG. 5 is a structural view for explaining a chip of an oscillator device 501 according to a fourth embodiment of the present invention. Specifically, FIG. 5 is a sectional view illustrating that the oscillator device 201 of the first embodiment (oscillator device 501 in FIG. 5) is being fixed to a stationary base plate 505 while sandwiching a spacer 504 therebetween, thus the oscillator device being structured into a chip.

The driving electrode pad 502b of the oscillator device 501 and the electrode pad 503 of the supporting base plate 505 are electrically connected and fixed while sandwiching the spacer 504 therebetween. The spacer 504 is comprised of an electric conductor bump made of ball solder or conductive adhesive. It can electrically connect the electrode pad 503 with the electrode pad 502b connected to the wiring of the driving actuator, such that a driving current signal can be applied from the electrode pad 503. By using this spacer 504, it is assured to torsionally oscillate the movable plate of the oscillator device 501 without contacting the supporting base plate 505. It should be noted that, in FIG. 5 the electrode pad 502a connected to the electric wiring of the sensor is communicated with an outside circuitry through a bonding wire, for example.

In accordance with the present embodiment, complexity of mounting due to upper and lower electric wirings of the oscillator device 501 can be reduced.

Fifth Embodiment

Figure 6:
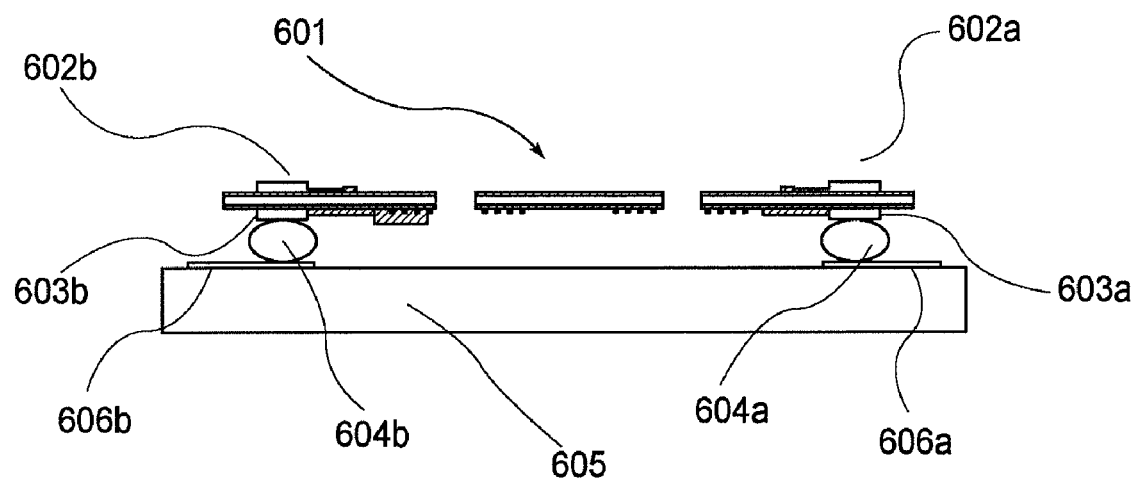
FIG. 6 is a sectional view showing an oscillator device according to a sixth embodiment of the present invention.

FIG. 6 is a structural view for explaining a chip of an oscillator device 601 according to a fifth embodiment of the present invention. Specifically, FIG. 6 is a sectional view illustrating that the oscillator device 301 of the second embodiment (oscillator device 601 in FIG. 6) is fixed to a stationary base plate 605 while sandwiching spacers 604a and 604b therebetween, thus the oscillator device being structured into a chip. The oscillator device 601 itself is the same as the oscillator device 301 of the second embodiment.

The driving electrode pads 603a and 603b of the oscillator device 601 and the electrode pads 606a and 606b of the supporting base plate 605 are electrically connected and fixed while sandwiching the spacers 604a and 604b therebetween. The spacers 604a and 604b are comprised of an electric conductor bump. These spacers can electrically connect the driving electrode pads 603a and 603b with the electrode pads 606a and 606b such that driving current signals can be applied from the electrode pads 606a and 606b. By using these spacers 604a and 604b, it is assured to torsionally oscillate the movable plate of the oscillator device 501 without contacting the supporting base plate 605. It should be noted that, in FIG. 6 as well, the electrode pads 602a and 602b connected to the electric wiring of the sensor are communicated with an outside circuitry through a bonding wire, for example.

In the present embodiment as well, complexity of mounting due to upper and lower electric wirings of the oscillator device 601 can be reduced.

Sixth Embodiment

Figures 7A, 7B, 7C:
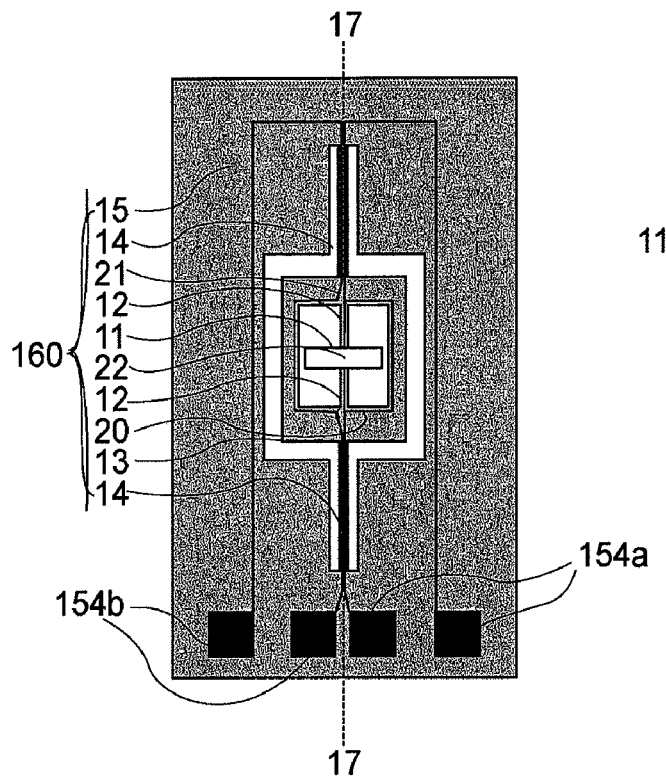
FIG. 7A is a top plan view illustrating an optical deflector according to a seventh embodiment of the present invention.
FIG. 7B is a top plan view illustrating a portion around a first movable element of the optical deflector of FIG. 7A.
FIG. 7C is a top plan view illustrating a driving means of the optical deflector of FIG. 7A.

FIG. 7A, FIG. 7B and FIG. 7C are top plan views illustrating an optical deflector which is based on an oscillator device according to a sixth embodiment of the present invention. Specifically, FIG. 7A shows an oscillation system 160, and FIG. 7C illustrates a stationary frame 150 for holding the vibration system 160 and a driving means.

As shown in FIG. 7A, the oscillation system 160 of the optical deflector according to the present embodiment comprises a first movable plate 11, a first torsion spring 12 for coupling the first movable plate 11 to a second movable plate (gimbals) 13 to resiliently support the same, and a second torsion spring 14 for resiliently supporting the second movable plate 13 relative to a supporting base plate 15. A heater wire (heating element) 20 is formed on the first surface (shown in FIG. 7A) of the first torsion spring 12 and the second torsion spring 14. Furthermore, the heater wire 20 is communicated with a control circuit through electrode pads 154a and 154b.

The first and second movable plates 11 and 13 are torsionally oscillated about a torsion axis 17 by driving means. Here, the oscillation system 160 is integrally made from a monocrystal silicon substrate, on the basis of a photolithography process and a dry etching process which are generally performed in semiconductor manufacturing processes. Thus, the finishing precision thereof is very high, and a very small-size oscillation system can be produced. Furthermore, since the monocrystal silicon has high Young's modulus and small density, deformation of the movable plate due to its self-weight is less. Thus, an oscillation system having high amplitude amplification factor in the resonance can be accomplished.

In this example, the first movable plate 11 has a size 3 mm in a direction perpendicular to the torsion axis 17, and a size 1 mm in a direction parallel to it. The first torsion spring 12 is 1.3 mm in length, and the second torsion spring 14 is 6 mm in length. The overall length of the oscillation system 160 is about 20 mm.

The first movable plate 11 is supported at its opposite ends by a pair of first torsion springs 12. Since the first movable plate 11 is formed with a reflection surface 22, the surface flatness thereof when the same is driven is crucial. By supporting the first movable plate with use of a pair of torsion springs as described, deformation due to the self-weight thereof is reduced and good surface flatness smoothness is kept, particularly as compared with a case where a single torsion spring is used.

Similarly, the second movable plate 13 is supported at its opposite ends by a pair of second torsion springs 14. With this arrangement, the oscillation system 160 less produces unwanted oscillation or displacement other than torsional oscillation about the torsion axis 17.

As described above, the first movable plate 11 has a reflection surface 22 which is an optical deflector for deflecting light and, in response to torsional oscillation of the first movable plate 11, light from a light source (not shown) is scanningly deflected. The reflection surface 22 is made of aluminum and is formed by vacuum deposition. However, the reflection surface may be made of any other materials such as gold or copper, for example. A protection film may be formed on it topmost surface.

FIG. 7C illustrates a stationary frame 150 and a driving means of the present embodiment. As illustrated, the driving means of the present embodiment is comprised of two permanent magnets 151 bonded to the second movable plate 13 and a fixed coil 152 being fixed to the stationary frame 150. The permanent magnets 151 comprise a metal magnet of prism-like shape, having a length of about 1 mm and a section of a size 150 μm×150 μm. The magnetization directions of the permanent magnets 151 are likewise in the longitudinal direction (a direction approximately perpendicular to the torsion axis 17), and the magnets are fixed to the second movable plate 13 by using an adhesive.

The stationary frame 150 appropriately holds the positions of the oscillation system 160, permanent magnets 151 and fixed coil 152. In this example, the stationary frame 150 is made of aluminum. However, any other ordinary metal materials such as an alloy containing iron or an alloy containing copper may be used.

By applying an alternating driving current to the fixed coil 152, a magnetic field is produced in a direction approximately perpendicular to the sheet of the drawing of FIG. 7C. This magnetic field acts on the permanent magnets 151 to cause a torque about the torsion axis 17, by which the movable plates 11 and 13 are driven.

On the other hand, as shown in FIG. 7C, the supporting base plate 15 is fixed to the stationary frame 150 only at the bonding portion 155 depicted by hatching in the drawing. As seen from FIG. 7C, the connecting portion 155 for connecting the supporting base plate 15 to the stationary frame 150 is defined only at a position close to the base end of one of the two second torsion springs 14. This means that the oscillation system 160 has a cantilevered structure with respect to the stationary frame 150. As a result of such cantilevered structure, the axial stress to the torsion spring from the stationary frame 150 is reduced significantly.

Furthermore, in the present embodiment, as shown in FIG. 7A, two heating elements, that is, a first heater wire 20 and a second heater wire 21 are used. These two heater wires are provided with first and second electrode pads 154a and 154b, respectively, so as to control the heat generation rates of these heaters independently of each other. These pads are communicated with associated control circuits, respectively.

The first heater wire 20 extends along the first electrode pad 154a, second torsion spring 14, second movable plate 13 and first torsion spring 12. On the other hand, the second heater wire 21 extends along the second electrode pad 154b, second torsion spring 14 and second movable plate 13. The first heater wire 20 is folded back on the first torsion spring 12 as shown in FIG. 7B to enable heating of the first torsion spring 12. Depending on the degree of required heat application to the first torsion spring 12, the electrical resistance of the first heater wire 20 in the portion at the first torsion spring 12 may be enlarged.

On the other hand, the second heater wire 21 is so structured to have a large electrical resistance in the portion at the second torsion spring 14, to enable heating of the second torsion spring 14.

With this structure, the first heater wire 20 can heat the first torsion spring 12, while the second heater wire 21 can heat the second torsion spring 14. Thus, by controlling these heaters independently of each other, independent temperature adjustment of the first and second torsion springs is accomplished.

In this embodiment, the heater wires 20 and 21 are directly formed on the top surfaces of the respective torsion springs. Therefore, the portion which most influences the frequency of the natural oscillation mode can be heated effectively. Thus, not only the power consumption for thermoregulation can be made small but also, since the heat capacity is small, thermoregulation time can be shortened.

Here, there is such property that, of the two natural oscillation modes which the oscillation system 160 bears, the fundamental frequency is largely influenced by the torsional rigidity of the second torsion spring 14, while the secondary natural oscillation mode is largely influenced by the torsional rigidity of the first torsion spring 12. Thus, based on independent temperature control of the first torsion spring 12 and the second torsion spring 14 described above, both of the two resonance frequencies to be used for the drives of the oscillation system 160 of the present embodiment can be adjusted very precisely.

Furthermore, a piezoresistive element which is an angle sensor having been explained with reference to the above embodiment as well as electric wirings therefor, are formed on the surfaces of the torsion spring 12 and 14 of the present embodiment, which surfaces are at the back of the surface shown in FIG. 7. Based on the signal from this displacement angle sensor, the above-described heater wire is controlled so that the movable plate oscillates in a predetermined form.

In the present embodiment, since the Joule heat generation rate is adjusted by adjusting the quantity of voltage application to the heating element, the temperature control of the torsion springs 12 and 14 is enabled. For example, by keeping the supporting member temperature constant with use of the heater provided at the supporting member, the resonance frequency of the oscillator device can be held constant. Furthermore, by changing the supporting member temperature to a desired temperature, for example, the resonance frequency of the oscillator device can be changed.

Moreover, by using resistance heating based on a thin-film resistor, heat application can be done with a very simple structure.

As described above, in the present embodiment as well, since the heater wire which is a functional device and the electric wirings of the piezoresistive element are formed on different surfaces of the torsion spring, similar advantageous results as of the preceding embodiments are attainable. Furthermore, since the resistance value of the piezoresistive element changes with a temperature change, the piezoresistive element should preferably be used at a constant temperature. In the present embodiment, in this respect, the piezoresistive element is provided on the different surface of the supporting member where a heater wire is formed. Thus, in this embodiment, the temperature of the piezoresistive element as well can be kept constant. Therefore, the influence of the temperature against the piezoresistive element can be reduced.

More specifically, in the present embodiment, by keeping the temperature of the supporting member constant with use of a heater wire, both of keeping a constant resonance frequency of the oscillator device and a constant characteristic of the piezoresistive element are accomplished at the same time.

Since the oscillation system 160 of the present embodiment has a cantilevered structure as described above, the axial stress from the stationary frame 150 is reduced. As a result, any change in the torsional rigidity of the first and second torsion springs 12 and 14 is one that substantially follows the temperature change of the Young's modulus only. Hence, they have approximately the same changing rate.

Then, with regard to the change in the two resonance frequencies of the oscillation system 160 (frequency of natural oscillation mode), they have approximately the same changing rate with respect to the temperature change. Thus the two resonance frequencies can be changed simultaneously at the same rate by means of the thermoregulation based on the heater wires, and therefore these two resonance frequencies can be easily adjusted to a desired frequency. At the same time, since the axial stress is reduced, even if the temperature of the oscillation system 160 changes due to the frequency adjustment, the first oscillation movable element 11 on which the reflection surface 22 is formed can keep its surface flatness.

It is to be noted that, although in this example a piezoresistive element and electric wirings therefor are formed on the back surface of the torsion springs 12 and 14, like the second embodiment shown in FIG. 3 the electric coil of the driving actuator may be provided on the movable plate and the electric wiring therefor may be formed on the surface of the torsion springs 12 and 14 which is at the back of the surface shown in FIG. 7. Even with such structure, advantageous results similar to those described above are attainable.

Seventh Embodiment

Figure 8:
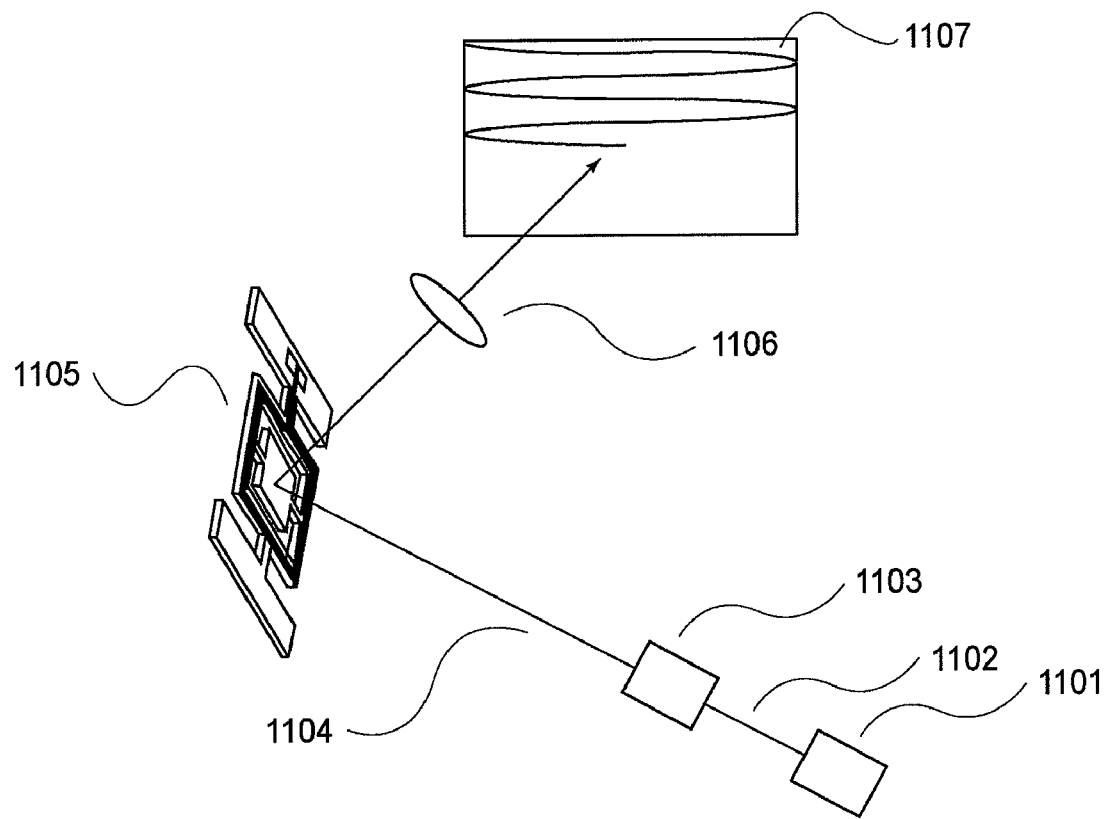
FIG. 8 is a schematic view showing an image forming apparatus according to the seventh embodiment of the present invention.
Figure 9:
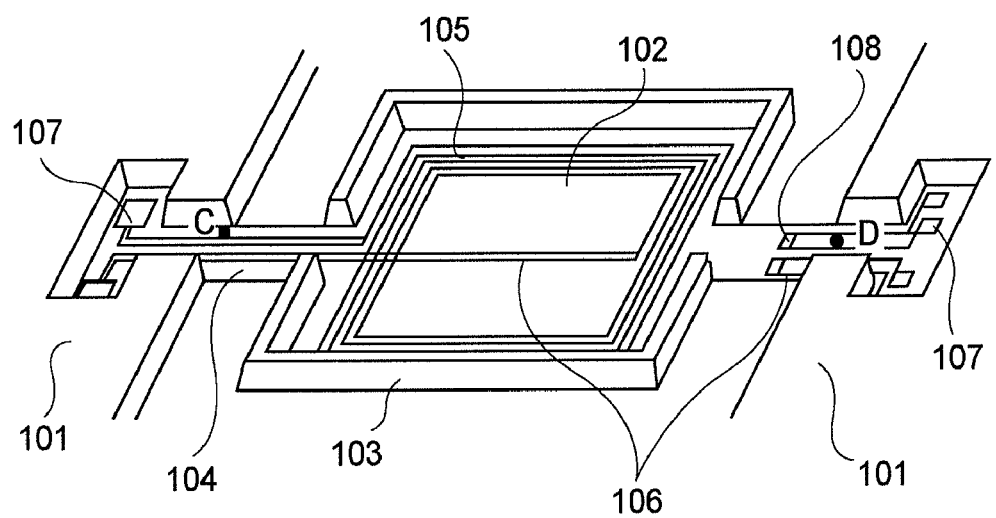
FIG. 9 is a perspective view showing the structure of a known type oscillator device.

FIG. 8 is a structural view for explaining a visual display unit which is an image forming apparatus based on an oscillator device or an oscillator chip of the present invention.

In the visual display unit of the present embodiment, by using a modulating signal 1102 from a light source modulation driving member 1101, a direct modulation light source 1103 is modulated. The direct modulation light source 1103 comprises light sources of red, blue and green colors which can be modulated directly. These colors may be mixed by use of a color mixing optical system.

An outgoing beam 1104 from the direct modulation light source 1103, being directly modulated, is projected on the reflection surface of the movable plate of the oscillator device 1105. The reflected light which is reflectively deflected by the movable plate goes through a correction optical system 1106, and it is displayed as an image on the image display surface 1107. The correction optical system 1106 is an optical system which corrects any image distortion due to the resonance scan.

Through the raster scan of output light 1104, an image is displayed on the image display surface 1107. In this embodiment, the inconveniences related to the electric wirings in an oscillator device 1105 are removed, and the deflection angle of the movable plate is detected and feedback controlled. As a result, a high-definition visual display unit in which light from a light source is deflected by an optical deflector and at least a portion of the light is incident on a surface to be irradiated, can be realized.

Furthermore, based on an oscillator device or an oscillator chip of the present invention, an image forming apparatus such as a copying machine in which light from a light source is deflected by an optical deflector and at least a portion of the light is incident on a photosensitive member surface which is the surface to be irradiated, can be realized.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-001885 filed Jan. 10, 2007, for which is hereby incorporated by reference.

What is claimed is:

1. An oscillator device, comprising:
a supporting base plate;
a supporting member connected to said supporting base plate, said supporting member having at least a first surface and a second surface, said first and second surfaces being distinct surfaces of said supporting member;
a movable plate supported by said supporting member for oscillating motion relative to said supporting base plate;
a first functional device having a first function;
a second functional device having a second function;
a first wiring connected to said first functional device and formed on said first surface of said supporting member; and
a second wiring connected to said second functional device and formed on said second surface of said supporting member.

2. An oscillator device according to claim 1, wherein said first functional device comprises a sensor provided on at least one of said movable plate and said supporting member, wherein said second functional device comprises an actuator provided on at least one of said movable plate and said supporting member, and wherein said actuator is configured to oscillate said movable plate relative to said supporting base plate.

3. An oscillator device according to claim 1, wherein said first functional device comprises an angle sensor provided on said supporting member, and wherein said second functional device comprises a heater provided on said supporting member.

4. An oscillator device, comprising:
a movable plate;
a first supporting member;

a gimbals configured to support, with said first supporting member, said movable plate for oscillating motion about a first oscillation axis;

a second supporting member;

a supporting base plate configured to support, with said second supporting member, said gimbals for oscillating motion about a second oscillation axis;

a first functional device having a first function;

a second functional device having a second function;

a first wiring connected to said first functional device and formed on a first surface of at least one of said first supporting member and said second supporting member; and a second wiring connected to said second functional device and formed on a second surface of said at least one supporting member, wherein said first and said second surfaces of said at least one supporting member being distinct surfaces of said at least one supporting member.

5. An oscillator device according to claim 4, wherein said first functional device comprises a sensor provided on at least one of said movable plate, said gimbals, said first supporting member and said second supporting member, wherein said second functional device comprises an actuator provided on at least one of said movable plate, said gimbals, said first supporting member and said second supporting member, and wherein said actuator is configured to oscillate said movable plate relative to said gimbals and to oscillate said gimbals relative to said supporting base plate.

6. An oscillator device according to claim 4, wherein said first functional device comprises an angle sensor provided on at least one of said first supporting member and said second supporting member, and wherein said second functional device comprises a heater provided on at least one of said first supporting member and said second supporting member.

7. An oscillator device according to claim 5, wherein said sensor comprises a physical quantity measuring sensor configured to convert a physical quantity, to be detected, into an electric signal and to output the same.

8. An oscillator device according to claim 5, wherein said actuator is comprised of a coil and a permanent magnet, and wherein said coil is provided on one of said movable plate and said gimbals.

9. An oscillator device according to claim 1, wherein said supporting member comprises a torsion beam or a curved beam.

10. An oscillator chip, comprising:
an oscillator device as recited in claim 1,
wherein said oscillator device is connected to a supporting base plate having an electrode pad, through a spacer, and
wherein said electrode pad is electrically connected, through said spacer, to an electrode pad of said oscillator device.

11. An optical deflector, comprising:
an oscillator device as recited in claim 1; and
an optical reflection surface provided on said movable plate.

12. An image forming apparatus, comprising:
a light source;
an imaging optical system;
an optical deflector as recited in claim 11; and
a surface to be irradiated with light,
wherein said optical deflector is configured to deflect light from said light source so that at least a portion of the light is incident on the surface to be irradiated.

* * * * *